(12) United States Patent
Rockwood

(10) Patent No.: US 8,360,410 B1
(45) Date of Patent: Jan. 29, 2013

(54) BAKING DOUGH PROCESSING ASSEMBLY

(76) Inventor: Gabriella Rockwood, Lockport, NY (US)

( * ) Notice: Subject to any disclaimer, the term of this patent is extended or adjusted under 35 U.S.C. 154(b) by 1037 days.

(21) Appl. No.: 12/322,098

(22) Filed: Jan. 29, 2009

(51) Int. Cl.
*B23Q 3/00* (2006.01)

(52) U.S. Cl. .................................. 269/302.1; 269/289 R

(58) Field of Classification Search .......... 269/302–303, 269/289 R; 425/195; 40/732–791
See application file for complete search history.

(56) References Cited

U.S. PATENT DOCUMENTS

| | | | |
|---|---|---|---|
| 2,026,829 A | | 1/1936 | Ellinger |
| 2,181,666 A | * | 11/1939 | Molin ............................ 249/158 |
| 2,411,857 A | | 12/1946 | Harriss |
| 2,521,982 A | | 9/1950 | Kors |
| 2,968,261 A | * | 1/1961 | Tonkin ........................... 425/169 |
| 3,166,027 A | * | 1/1965 | Sprenzel ........................ 425/183 |
| 3,322,074 A | | 5/1967 | Malnory |
| 3,958,797 A | | 5/1976 | Brow |
| 4,009,857 A | * | 3/1977 | Delmas ......................... 249/102 |
| 4,081,169 A | | 3/1978 | Lauter |
| 4,345,516 A | | 8/1982 | Sinclair |
| 4,522,580 A | * | 6/1985 | Poister .......................... 425/193 |
| 4,808,104 A | * | 2/1989 | D'Orlando ..................... 425/298 |
| 4,984,979 A | | 1/1991 | Hari |
| 5,383,293 A | * | 1/1995 | Royal .............................. 40/768 |
| 5,667,821 A | * | 9/1997 | Castaneda ..................... 425/218 |
| 6,000,237 A | * | 12/1999 | Sjoberg ......................... 62/457.2 |
| 6,010,325 A | * | 1/2000 | Lawrence ................. 425/364 R |
| 6,607,187 B1 | * | 8/2003 | Adler ......................... 269/302.1 |
| 6,838,105 B2 | | 1/2005 | Finkowski et al. |
| 2005/0072317 A1 | * | 4/2005 | Thorstad ...................... 99/450.1 |

OTHER PUBLICATIONS

"Baking Tools & Equipment" © 2001-2005 Armchair World, Los Angeles, California, http://armchair.com/store/gourmet/baking/dougboard1.html, accessed Jul. 9, 2007, pp. 1-3.

* cited by examiner

*Primary Examiner* — Lee D Wilson
*Assistant Examiner* — Marc Carlson
(74) *Attorney, Agent, or Firm* — Simpson & Simpson, PLLC

(57) ABSTRACT

The present invention is a dough board assembly including an outer frame having top and bottom edges, an inner perimeter with the inner perimeter having at least one shoulder, at least one inner board sized to rest on the at least one inner shoulder within the inner perimeter so that at least one of the top and bottom edges extend above the inner board as it rests on the at least one shoulder. The inner perimeter has at least one perimeter length and at least one perimeter width. In an alternate embodiment, the assembly further includes a insert defining at least one orifice. In a second embodiment, the invention further comprises a rolling pin.

22 Claims, 15 Drawing Sheets

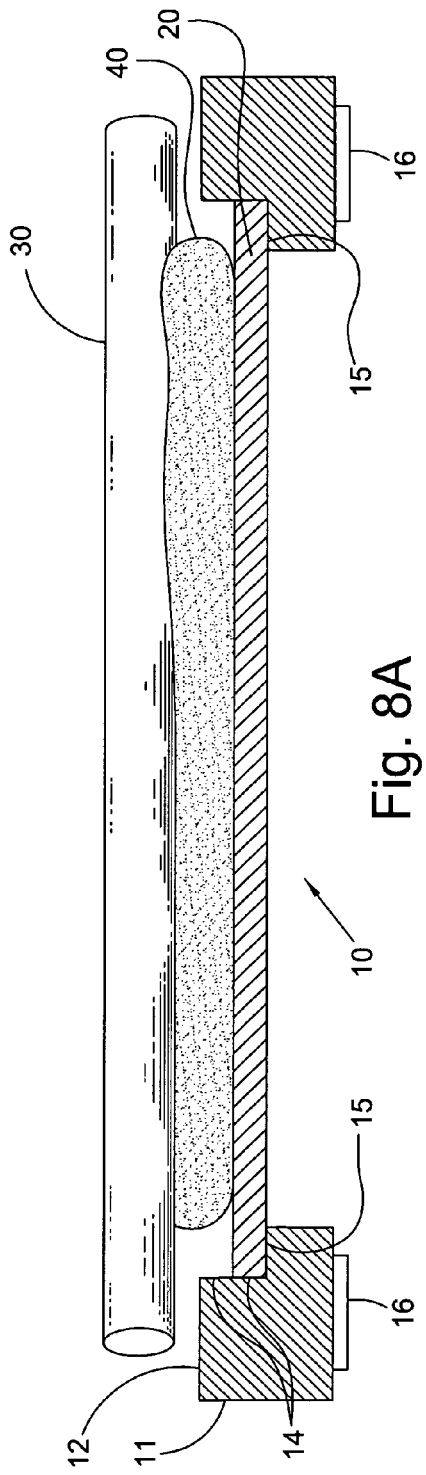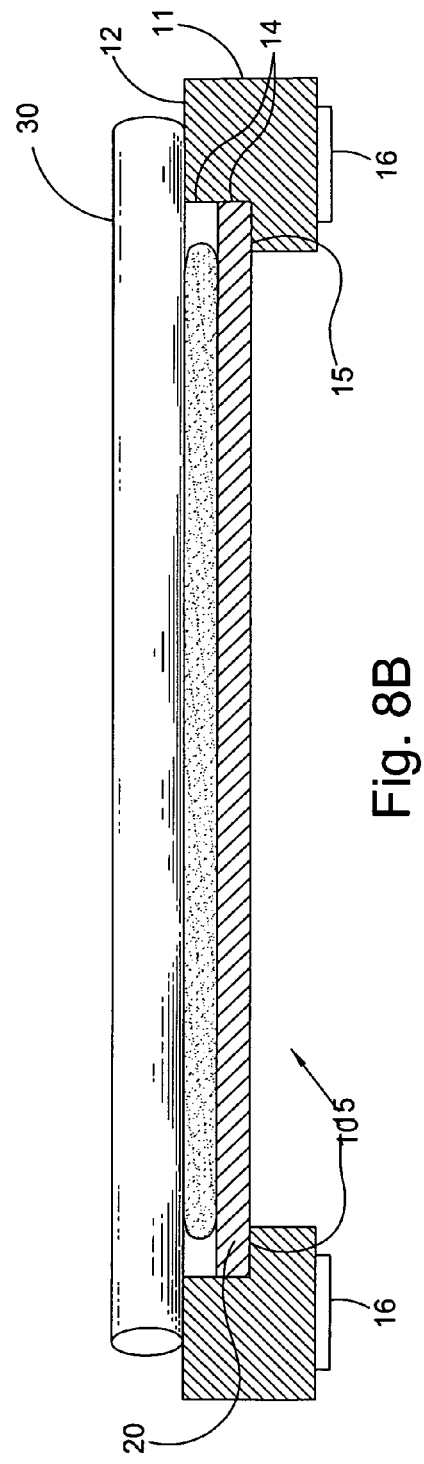
Fig. 8A
Fig. 8B

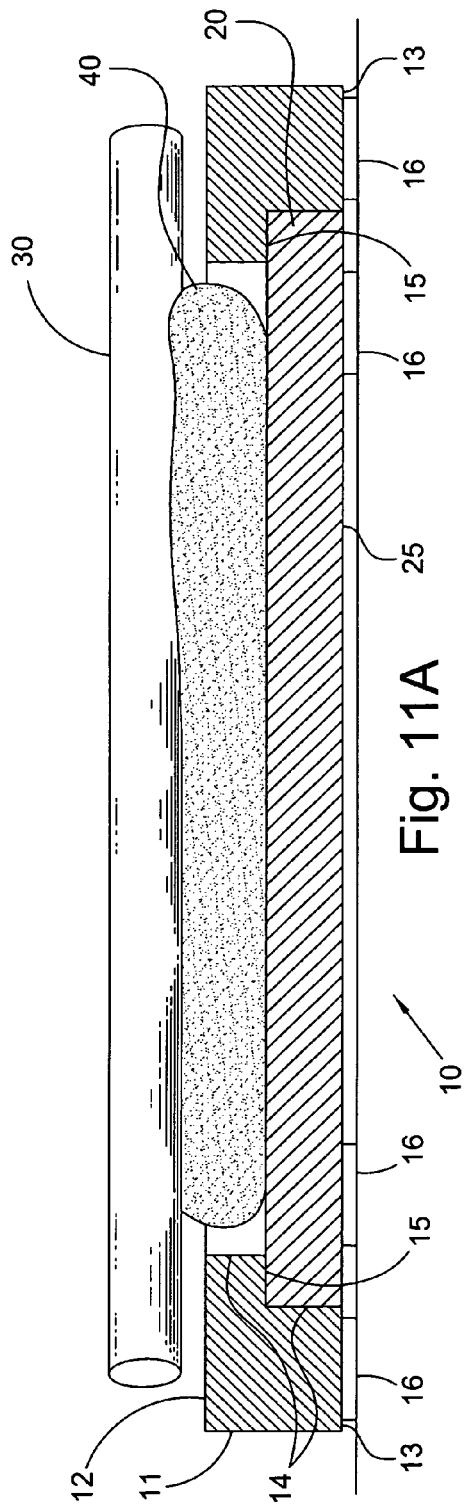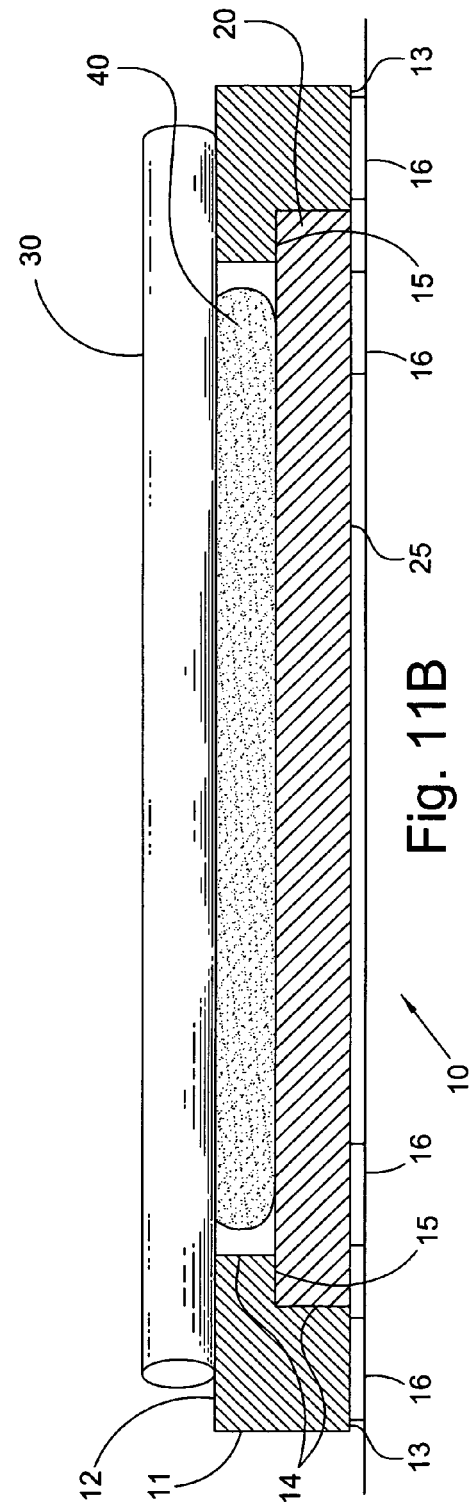

BAKING DOUGH PROCESSING ASSEMBLY

FIELD OF THE INVENTION

The present invention relates to the field of food processing, specifically to the field of baking, and more specifically to equipment for the preparation of baking dough for cutting and cooking.

BACKGROUND OF THE INVENTION

Baking dough is used to make a variety of baked goods including, but not limited to, cookies, pie crusts, breads, pretzels, and pizza. Typically, dough is produced by mixing the various ingredients until a relatively soft, malleable mixture is produced. The dough may then, for example, be formed into a specific shape, as in a pretzel, formed into a particular shape as for a bread loaf, or rolled into a flat sheet and cut into a desired shape, such as a shaped cookie.

When baking dough is rolled into a flat sheet, flour is often used to prevent the dough from sticking on the working surface, the rolling pin, or other item in the work area. The flour often is inadvertently spread throughout a large portion of the kitchen, bakery, or other work station which leads to dirty conditions and even the unwanted introduction of flour into other foods or ingredients.

This problem of unwanted flour distribution is aggravated by the breaking off of small pieces or crumbs of dough while it is being processed. In a typical large flat working surface, such as a kitchen or bakery counter, these dough crumbs are often dispersed over wide areas. Therefore, it would be helpful if both flour and dough crumbs were confined to a small, specific space where the dough is actually processed.

Another difficulty often found in working or processing baking dough is the need to achieve a uniform desired thickness of the final product. As dough is rolled, different amounts of pressure may be placed on different parts of the dough so that some parts of the resulting sheet of dough are thinner than other parts. Typically, the perimeter of the sheet is thinner than the interior of the sheet. As a result, forms, such as cookies, that are cut out of the perimeter of the sheet are thinner and often require lower baking temperatures or shorter baking times than thicker forms. In the same vein, the thinner edge portion of a larger piece, such as a pie crust may require a shorter cooking time and/or lower temperature than the thicker interior of the pie crust. Obviously, determining correct baking times becomes more difficult and problematic when pieces with different thicknesses are baked at the same time. It would be advantageous, therefore, to produce pieces having a more closely uniform thickness to allow for more consistent baking times and temperatures.

An additional factor to be considered in processing baking dough is the desirability of keeping the dough chilled as long as possible. Mixed dough is usually stored in a refrigerator and rolled or otherwise processed on surfaces such as marble or granite that will help to maintain the chilled temperature as long as possible. Inevitably, the longer the dough is processed, the warmer it becomes. When warm, the shortening component in the dough breaks down and the dough them becomes sticky and harder to work. Therefore, it would be beneficial to provide a device or apparatus that would keep the dough in a chilled condition or at least slow the rate of warming of the dough.

A dough board seen at http://armchair.com/store/gourmet/baking/doughboard1.html includes a frame and a board assembly (the "armchair assembly") that is described as adjustable to provide for rolling dough sheets with different thicknesses. Similarly, U.S. Pat. No. 6,607,187 to Adler discloses a board for rolling dough, preferably fabricated from wood in which an outer frame is provided with a plurality of grooves and tongues onto which a board may be positioned at different heights within the frame. Neither of these prior art devices addresses the problem of maintaining the dough at a chilled temperature while it is being processed. In addition, both the armchair assembly and the board disclosed in the '187 patent are made with a non-integral construction from different pieces of wood fastened together providing numerous grooves, joints and cracks where pieces and crumbs of dough can lodge making thorough cleaning difficult and often uncertain. This is compounded in the dough board seen in the '187 patent by the use of numerous tongue and groove combinations each of which is a place where dough crumbs, flour, and dirt may lodge without being successfully removed.

Thus, there is a need in the field for a device that will enable the user to reduce the distribution of processing waste such as flour and crumbs when dough is processed, is easy to clean, and also enable the dough to be maintained at a lower temperature for a longer period of time while it is being processed.

SUMMARY OF THE INVENTION

The present invention broadly comprises a dough board assembly comprising an outer frame, the outer frame including an upper edge and a lower edge, at least one shoulder extending from an inner perimeter of the outer frame, at least one perimeter length, at least one perimeter width wherein the at least one inner perimeter length is equal to or longer than the at least one inner perimeter width. The dough board assembly also includes at least one inner board having an upper surface and a lower surface and sized to fit on the at least one shoulder within the inner perimeter, and a rolling pin having a length greater than the inner perimeter length so that at least one of the upper surface and the lower surface is below one or both of the upper edge and the lower edge. In a preferred embodiment, the dough board assembly also includes at least one insert defining an orifice. In another preferred embodiment, the outer frame and at least one shoulder together are formed into an integral construction. In a more preferred embodiment, the bottom surface of the outer frame includes one or more antiskid pads that extend from the outer frame and contact a counter or other working surface to prevent the dough board assembly from moving while the dough is being rolled or otherwise processed.

In an alternate embodiment, the dough board assembly broadly comprises an outer frame, the outer frame including an upper edge and a lower edge and at least one shoulder extending from an inner perimeter of said outer frame, with the inner perimeter having at least one perimeter length and at least one perimeter width, wherein the at least one inner perimeter length is equal to or longer than said at least one inner perimeter width. The dough board assembly also includes at least one inner board having an upper surface and a lower surface and sized to fit under the at least one shoulder within the inner perimeter, and a rolling pin having a length greater than the inner perimeter length so that the upper surface of the inner board is below the upper edge of the outer frame.

One object of the invention is to provide a dough board that allows the production of sheets of dough that have substantially the same thickness.

A second object of the invention is to supply a device that will allow the production of sheets of dough having different thicknesses.

A third object of the invention is to provide an apparatus that enables the user to produce rolled dough sheet having a defined shape and thickness.

An additional object of the invention is to supply a dough board assembly that is easily cleaned.

An additional object is to present a dough board assembly able to maintain a chilled temperature after refrigeration.

A further object of the invention is to present a dough board assembly designed to enable quick changes between different dough sheet thicknesses.

BRIEF DESCRIPTION OF THE SEVERAL VIEWS OF THE DRAWINGS

The nature and mode of the operation of the present invention will now be more fully described in the following detailed description of the invention taken with the accompanying drawing Figures, in which:

FIG. 8A is a cross section of the dough processing assembly of the present invention showing dough to be rolled within the inner perimeter of the outer frame;

FIG. 8B is the same cross section view seen in FIG. 8A with the dough rolled into a sheet within the inner perimeter;

FIG. 11A is a cross section of an alternate embodiment of the dough processing assembly of the present invention showing dough to be rolled within the inner perimeter of the outer frame;

FIG. 11B is the same cross section view seen in FIG. 11A with the dough rolled into a sheet within the inner perimeter;

DETAILED DESCRIPTION OF PREFERRED EMBODIMENTS OF THE INVENTION

At the outset, it should be appreciated that like drawing numbers on different drawing views identify identical structural elements of the invention. It also should be appreciated that figure proportions and angles are not always to scale in order to clearly portray the attributes of the present invention.

While the present invention is described with respect to what is presently considered to be the preferred embodiments, it is understood that the invention is not limited to the disclosed embodiments. The present invention is intended to cover various modifications and equivalent arrangements included within the spirit and scope of the appended claims.

Figure 1:
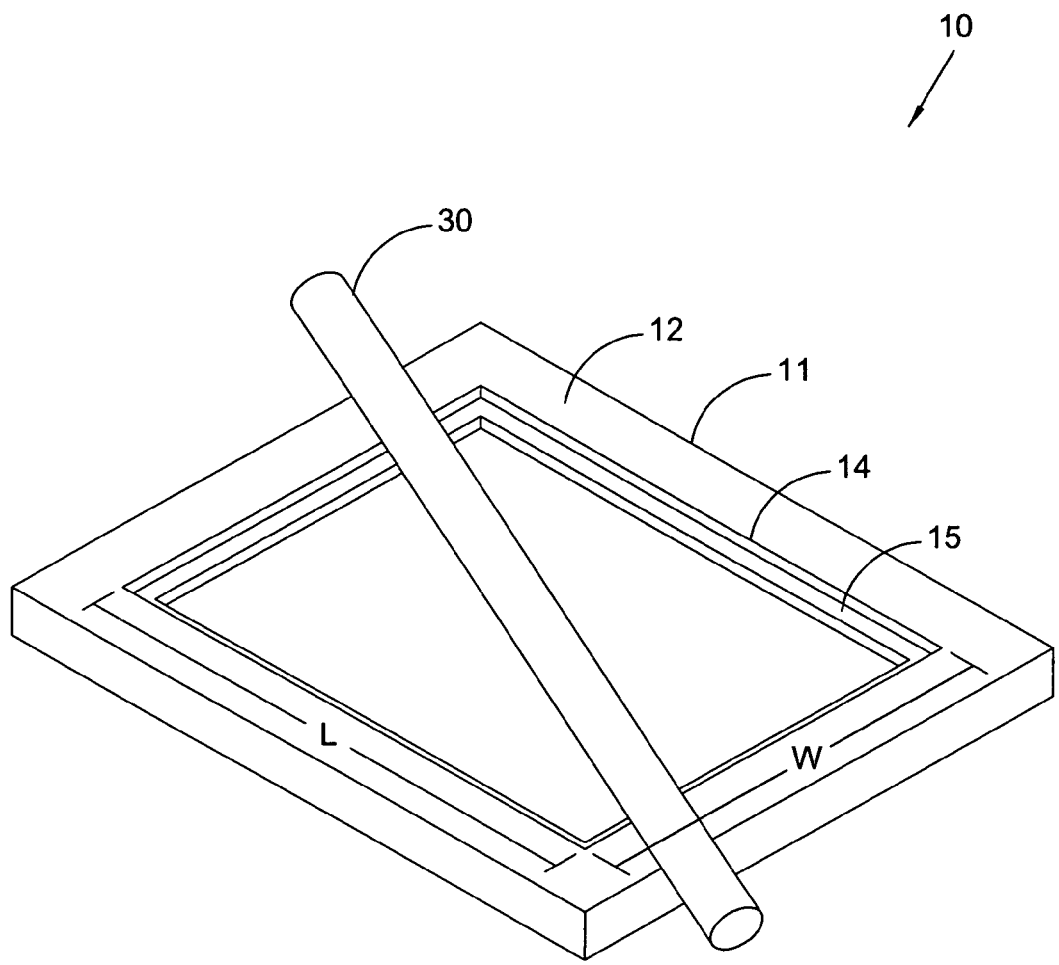
FIG. 1 is a top perspective view of the some of the components of the baking dough processing assembly.

Adverting to the drawings, FIG. 1 is a top perspective view of some of the components of the baking dough processing assembly 10 ("assembly 10"). Outer frame 11 comprises upper edge 12, lower edge 13 (not seen in FIG. 1), and inner perimeter 14 and surrounds an open space Inner perimeter 14 includes at least one shoulder 15 that extends from inner perimeter 14, preferably in a substantially perpendicularly direction. Long dimension length L (the length of inner perimeter 14) is shown as is shorter dimension width W (the width of inner perimeter 14). Width W may also be equal in length to length L. In a preferred embodiment, outer frame 11 is integral in construction. By integral is meant that a particular structure, in this case outer frame 11, is formed as a single piece without separate connecting or adhesive devices or compounds. In a preferred embodiment, rolling pin 30 is longer than length L. In a more preferred embodiment, rolling pin 30 is longer than the longest straight line distance between any two points of outer frame 11. In the embodiment seen in FIG. 1, the longest dimension is the distance between diagonally opposite corners.

Figure 2:
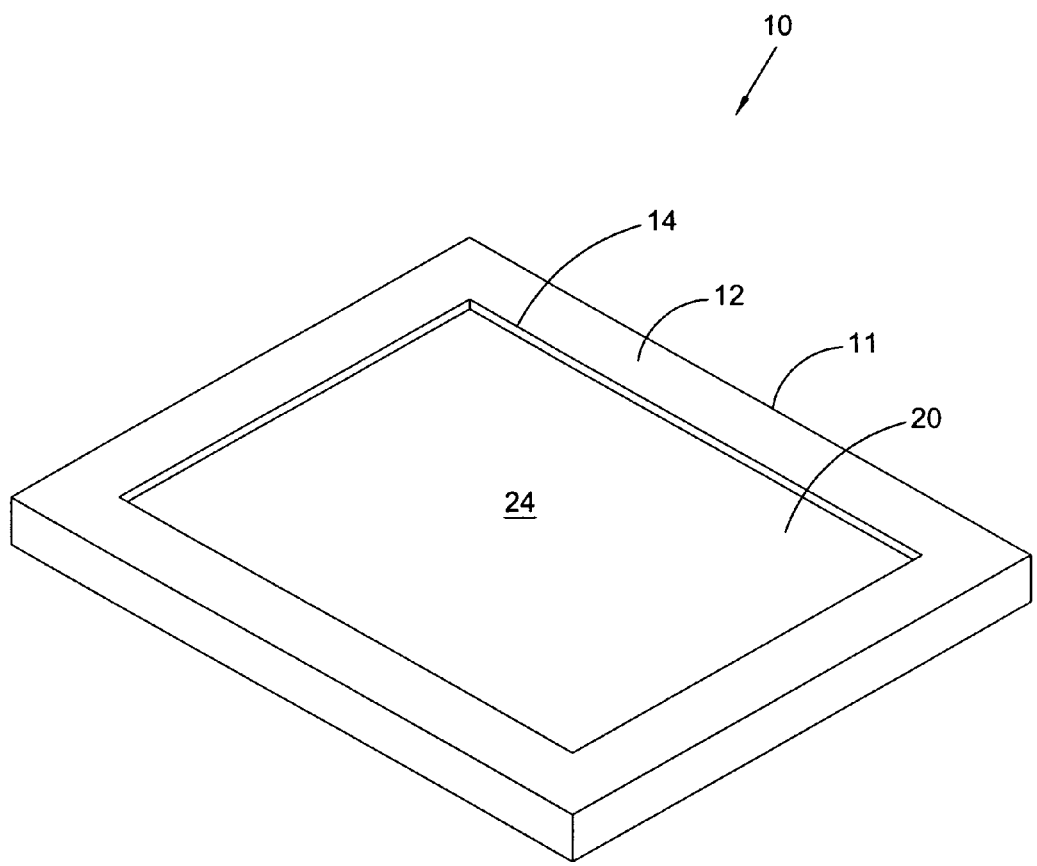
FIG. 2 is a top perspective view of the assembly showing the outer frame and inner board.

FIG. 2 is a top perspective view of assembly 10 showing outer frame 11 and inner board 20 ("board 20") in which inner board 20 fits within inner perimeter 14 and rests on shoulder 15 (not seen in FIG. 2). In the preferred embodiment shown, board 20 includes a flat continuous upper surface 24 and opposite lower surface 25 (not shown in FIG. 2) and is preferably sized to fit snugly within the space defined by inner perimeter 14 of outer frame 11 with upper edge 12 extending above upper surface 24 of board 20. The edges that extend between upper surface 24 and opposite lower surface 25 are smooth, that is having no indentations or extensions to enable inner board 20 to be easily removed from within outer frame 11.

Figure 3:
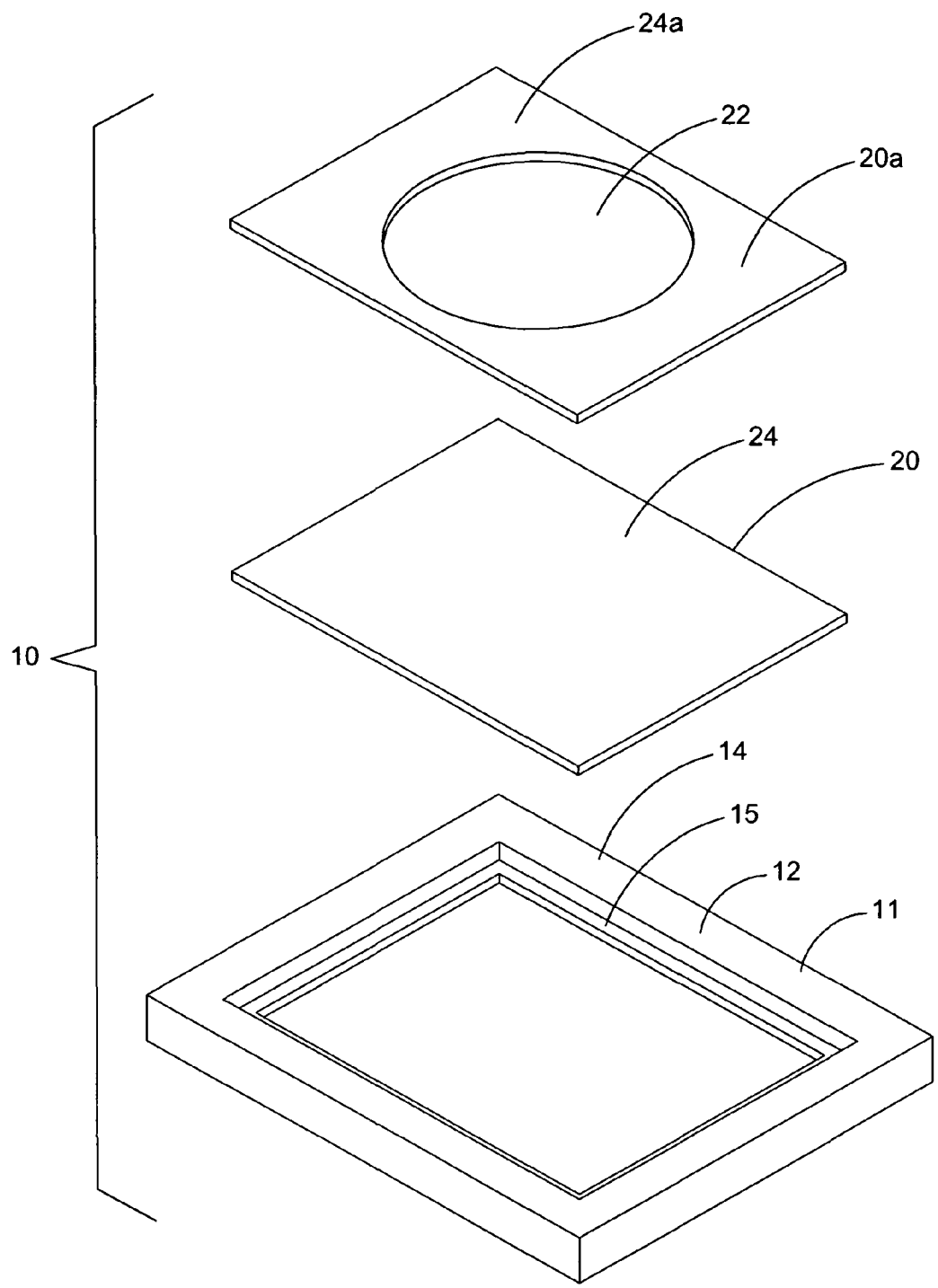
FIG. 3 is a top exploded perspective view of the assembly showing an insert defining an orifice.
Figure 3A:
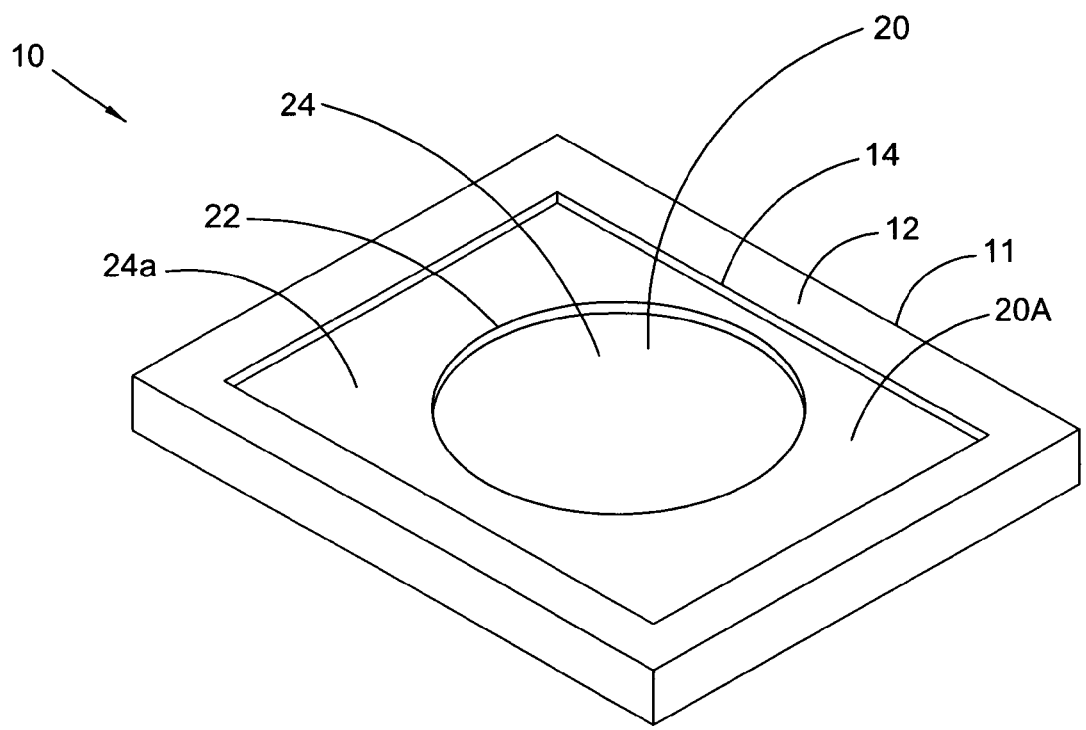
FIG. 3A shows the board and insert fitting snugly within inner perimeter of the outer frame.

FIG. 3 is a top exploded perspective view of an alternate embodiment of assembly 10 that includes insert 20a. Insert 20a includes surface 24a and defines at least one orifice 22. Insert 20a rests on board 20 and is preferably sized to fit snugly within perimeter 14 of outer frame 11. FIG. 3A shows assembled assembly 10 with insert 20a positioned on top of board 20 with both fitting snugly within inner perimeter 14 with upper edge 12 extending above upper surface 20a of insert 20a.

Figure 4A:
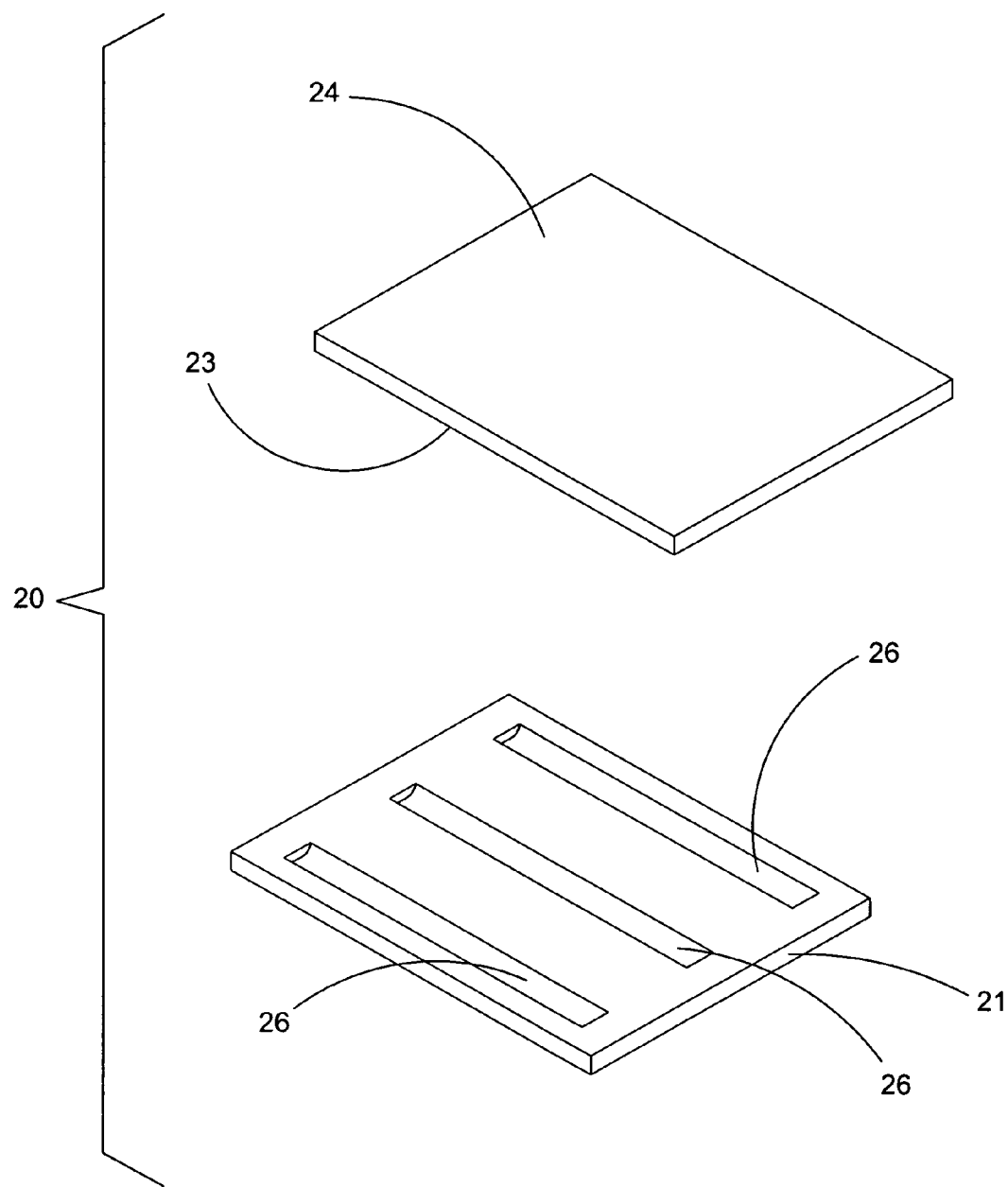
FIG. 4A shows a cross section view of the inner board in which the lower half of the inner board supports refrigerant grooves.
Figure 4B:
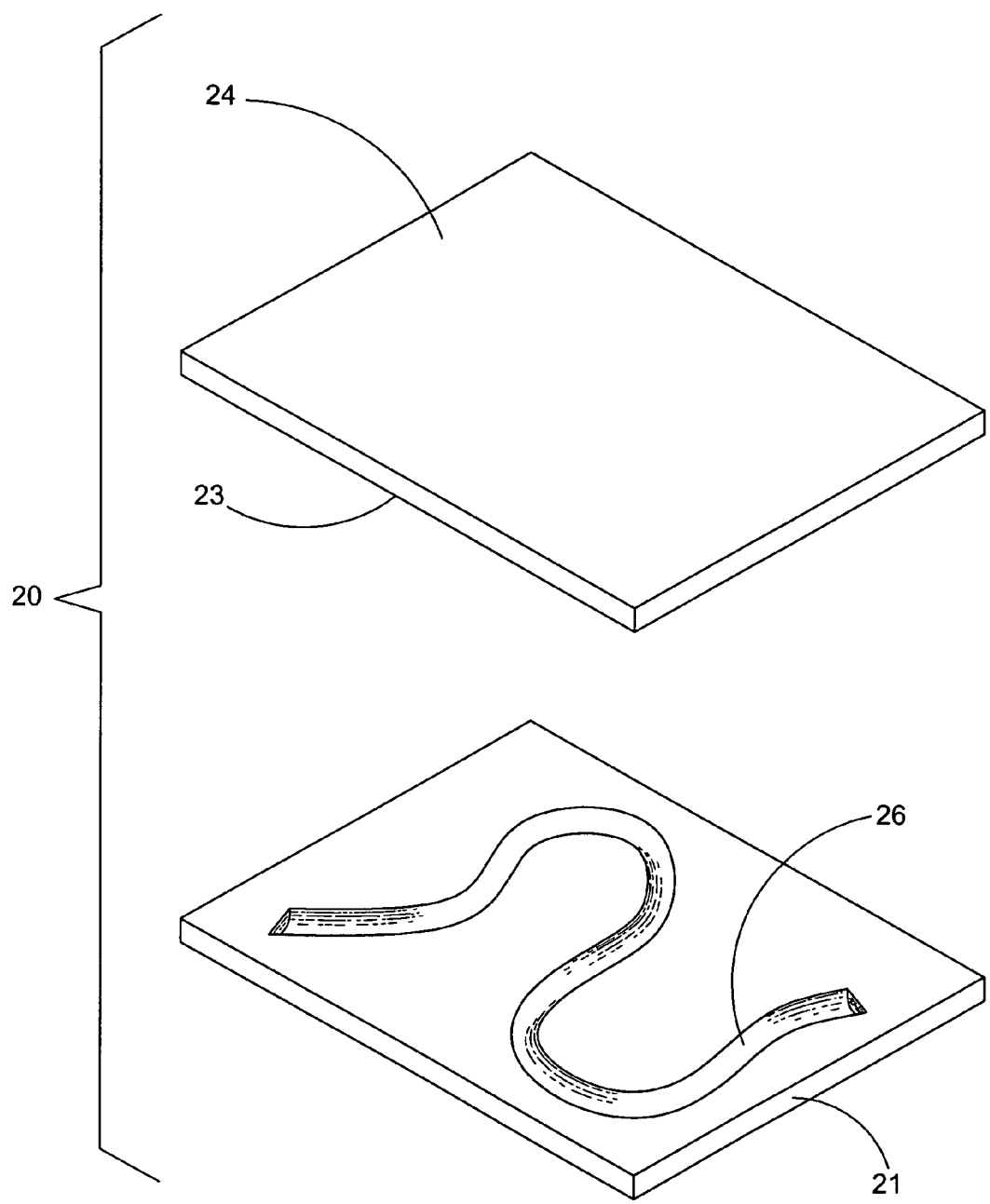
FIG. 4B shows a cross section view of the inner board depicting an alternate embodiment in which the refrigerant groove is a single continuous groove.

FIG. 4A shows a cross section view of a preferred embodiment of board 20 showing an upper half 23 and a lower half 21 of board 20. Lower half 21 contains a plurality of grooves 26. Grooves 26 are preferably terminated within the perimeter of board 20a. In this preferred embodiment, grooves 26 are filled with a refrigerant such as is used in reusable icepacks and cold packs. A suitable refrigerant is Cold Ice Gel Refrigerant from Cold Ice, Inc. located in Oakland, Calif. After filling grooves 26, upper half 23 is sealed onto lower half 21 to effectively seal the refrigerant within grooves 26 inside board 20. In an alternate preferred embodiment seen in FIG. 4B, a single groove 26 extends a suitable length within the perimeter of lower half 21 to ensure refrigerant is distributed in an even manner within lower half 21. Upper half 23 and lower half 21 may be sealed using methods well known to those with skill in the art, such as with suitable adhesives, plastic welding, and/or fasteners such as screws and nut and bolt assemblies. If necessary, groove(s) 26 may be lined to prevent leaching or leakage of the refrigerant from groove(s) 26 into board 20.

It is well known to persons having skill in the art that chilled or refrigerated dough is easier to roll and/or otherwise form. Warm or room temperature dough tends to stick to rolling pins or other shaping devices as well as countertops. In this regard, marble or granite countertops are often used to help maintain the pre-chilled temperature of refrigerated dough. By refrigerating or chilling grooved board 20 before rolling or shaping (collectively "processing") the dough, the cooled or refrigerated refrigerant within groove(s) 26 will help to maintain the chilled temperature of inner board 20, thus keeping the dough easier to process for a longer period of time. This allows the user to obtain the advantage of maintaining the chilled temperature of the dough while it is being worked without the necessity of resorting to expensive marble or granite countertops.

Figure 5:
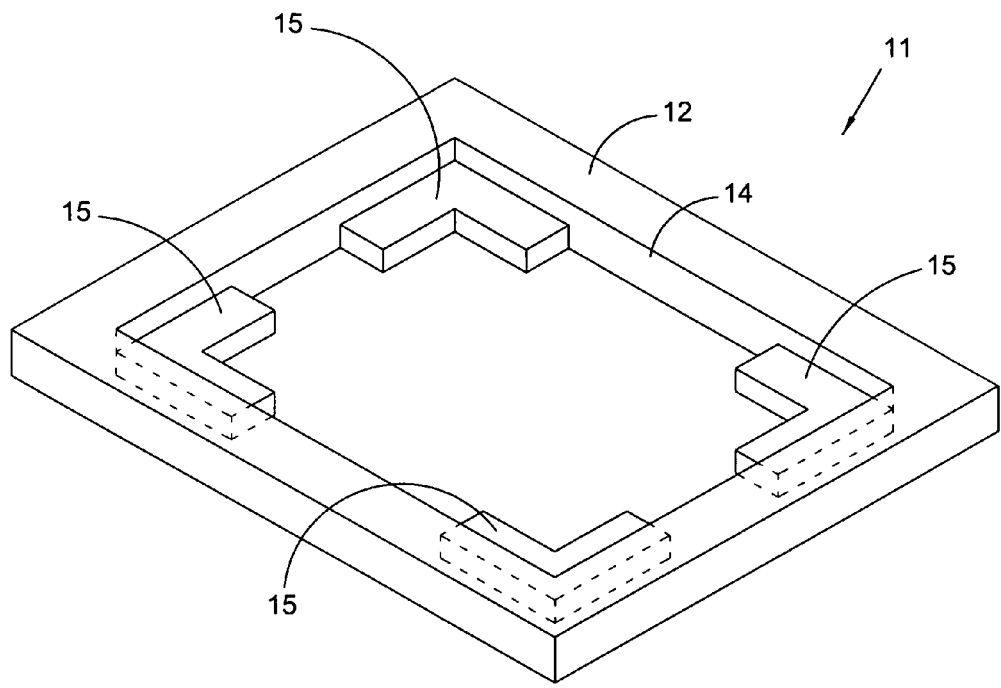
FIG. 5 is a top perspective view of the outer frame depicting an alternate embodiment for the shoulders positioned within the inner perimeter.

FIG. 5 is a top perspective view of outer frame 11 depicting an alternate embodiment for shoulder 15. Separate shoulders 15 are seen distributed within and attached to inner perimeter 14. Preferably, shoulders 15 are integral with outer frame 11. The several shoulders 15 will preferably be positioned so that when inner board 20 is placed within inner perimeter 12, it rests evenly on all of shoulders 15. The term "evenly" will be defined below. FIG. 5 portrays a preferred embodiment in which shoulders 15 extend to or are positioned on all sides of inner perimeter 12.

Figure 6A:
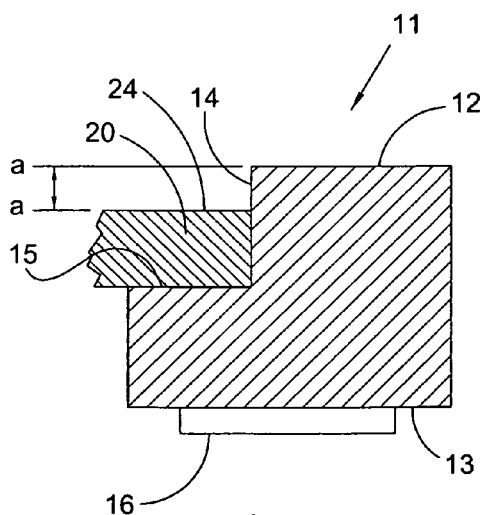
FIG. 6A is a cross section of the outer frame showing the shoulder in the form of a shelf extending substantially perpendicularly from the inner perimeter of the outer frame and holding the inner board.
Figure 6B:
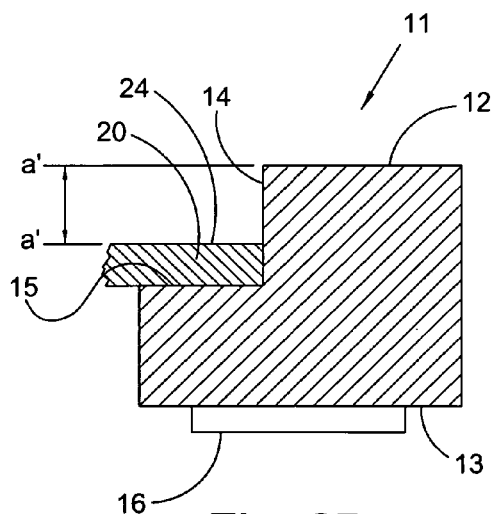
FIG. 6B is a cross section of the shoulder seen in FIG. 6A with the shoulder supporting a thinner inner board.

FIG. 6A is a cross section of frame 11 showing shoulder 15 in the form of a shelf extending from inner perimeter 14. In one embodiment, shoulder 15 will extend substantially perpendicularly from inner perimeter 14. To process dough, such as by rolling it into a sheet, board 20 is placed within inner perimeter 14 so as to rest evenly on shoulder(s) 15. By evenly is meant that top surface 24 of board 20 is substantially the same distance a-a below top edge 12 of outer frame 11 throughout the entire length of the perimeter of top edge 12. See FIG. 6A showing surface 24 below upper edge 12. FIG. 6B is a cross section of the same shoulder 15 seen in FIG. 6A with shoulder 15 supporting a different thinner inner board 20 thereby creating a longer distance a'-a' between board 20 and edge 12 than seen in FIG. 6A. Also seen in both FIGS. 6A and 6B are antiskid pads 16 ("pads 16") attached to and extending from lower edge 13. Pads 16 provide a friction surface to prevent assembly 10 from slipping on a working surface such as a kitchen counter when dough is being rolled or otherwise processed. Pads 16 may be fabricated from polyurethane or vinyl and other materials well known to those having skill in the art.

Figure 7:
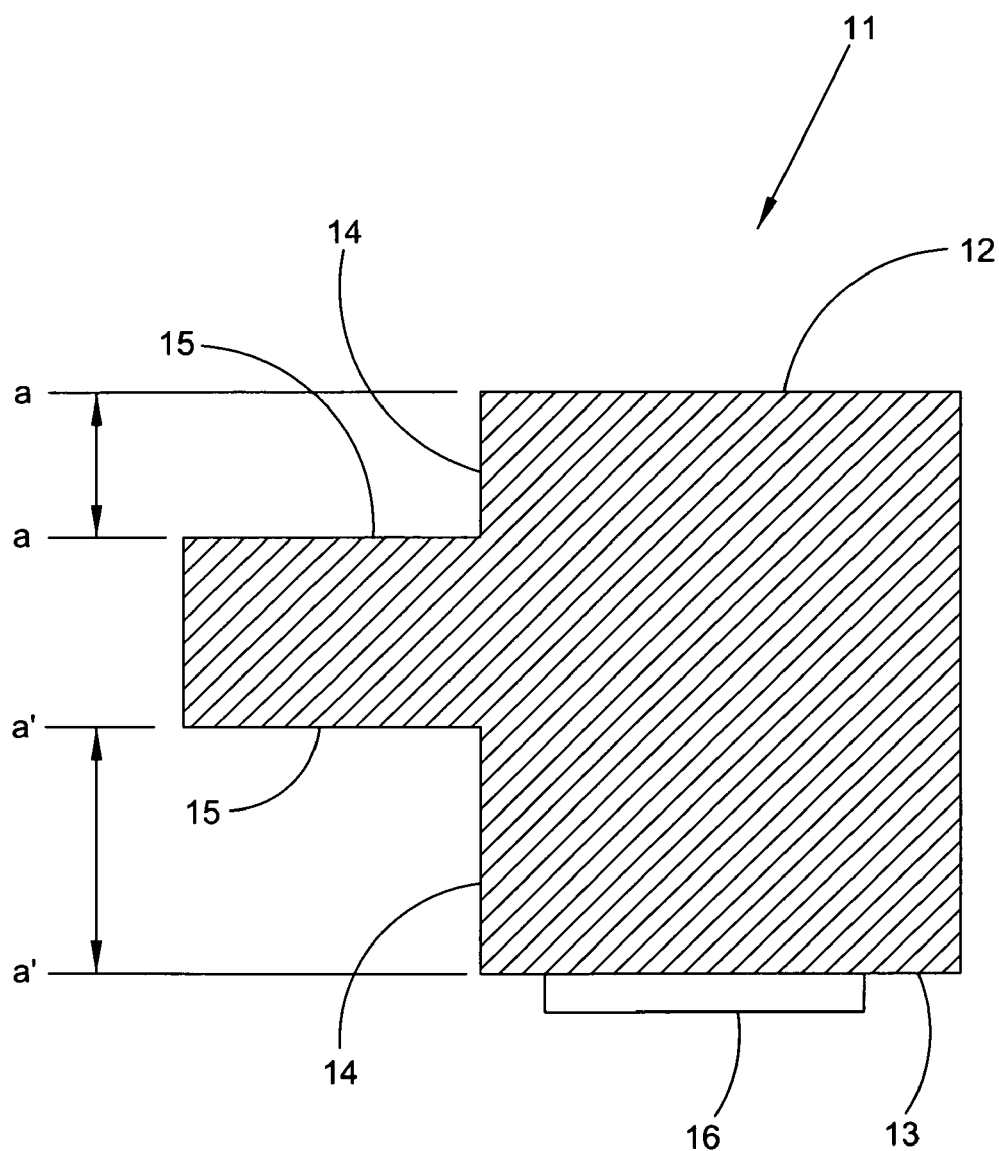
FIG. 7 is a cross section of the outer frame in which the shoulder is offset within the inner perimeter.

FIG. 7 is a cross section of the outer frame 11 portraying an alternate embodiment in which shoulder 15 is offset within inner perimeter 14. This forms two different length distances a-a and a'-a'. In this embodiment, the same board 20 can be used to form different distances a-a allowing the user to use a single board 20 to roll dough into sheets having two different thicknesses as described below.

FIG. 8A is a cross section of assembly 10 with inner board 20 placed within inner perimeter 14. Dough 40 is positioned within inner perimeter 14 and extends above upper edge 12. Rolling pin 30 is seen on top of dough 40 and extends across inner perimeter 14 to opposite sides of upper edge 12. Because rolling pin 30 is longer than length L, both ends of rolling pin 30 can always rest on upper edge 12 no matter how it is oriented in relation to frame 11. In a preferred embodiment, rolling pin 30 is longer than the longest length of outer frame 11, in this case the diagonal length between the two diagonally opposite corners. Therefore, as seen in FIG. 8B, the thick dough can be rolled to a uniform thickness a-a approximately the same as distance a-a as seen in FIGS. 6A and 6B. Board 20 holding rolled dough 40 can then be lifted off shoulder 15 and from inner perimeter 14 to be further processed. Antiskid pads 16 can also be seen in both FIGS. 8A and 8B.

Figure 9A:
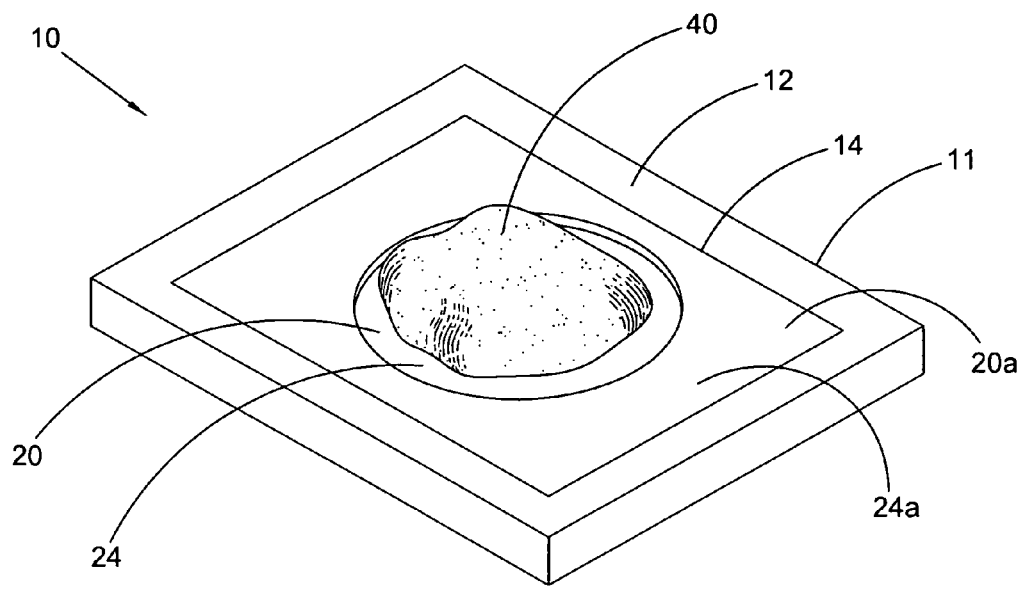
FIG. 9A is a top perspective view of the dough processing assembly to include an insert positioned on top of the inner board within the inner perimeter showing a ball of dough within the orifice of the insert.
Figure 9B:
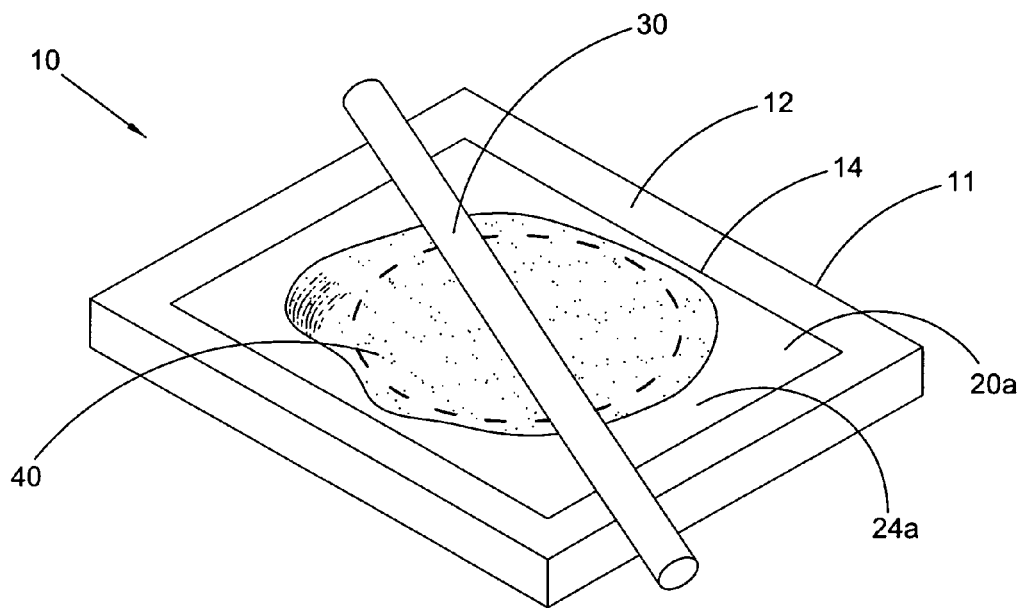
FIG. 9B is the same view as seen in FIG. 9A with the dough rolled to fill the orifice in the insert.
Figure 9C:
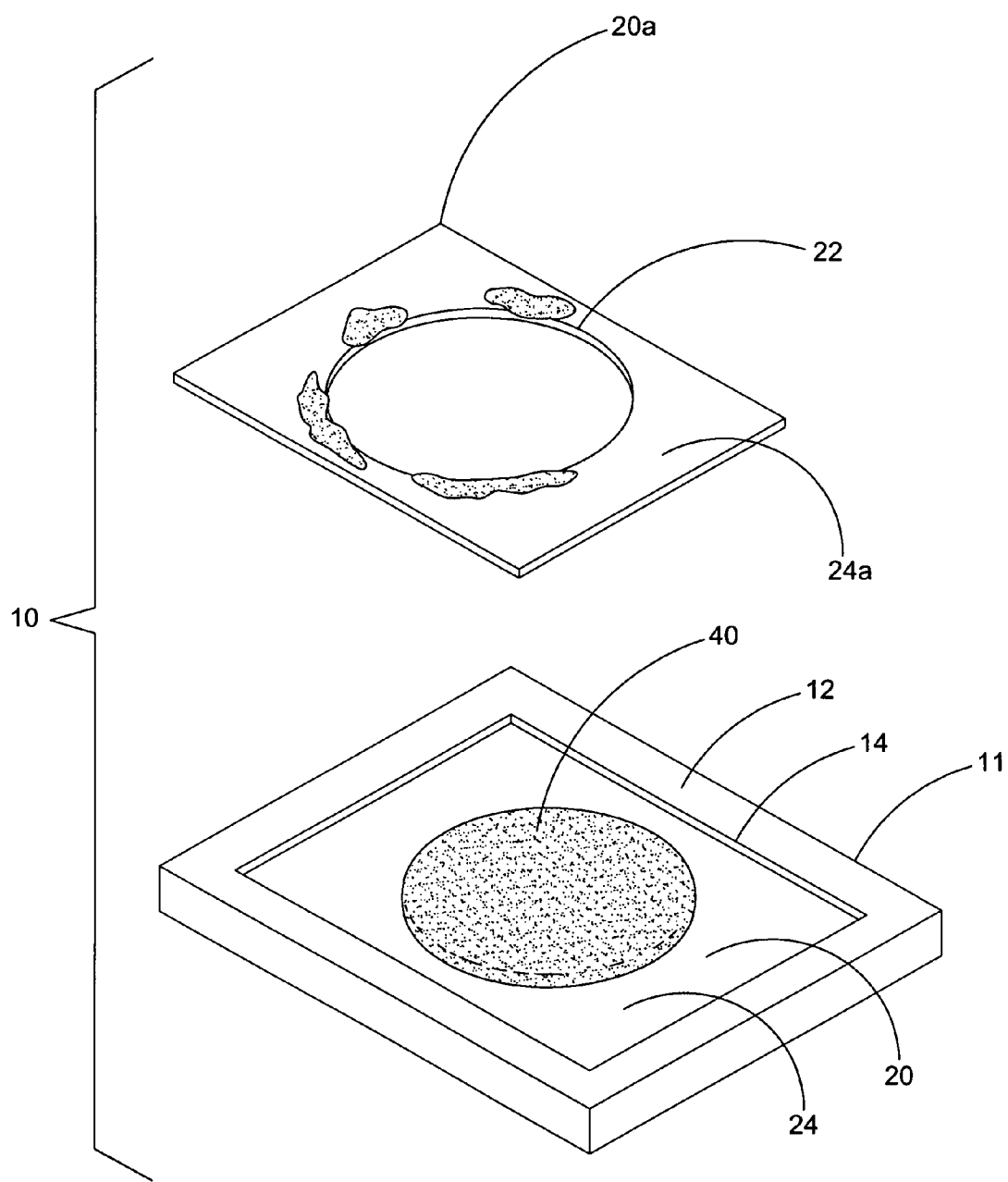
FIG. 9C shows the insert removed from the dough processing assembly with the rolled dough remaining in place on the inner board.

FIG. 9A is a top perspective view of assembly 10 to include insert 20a positioned on top of board 20 within inner perimeter 14. Dough 40 is placed within orifice 22. FIG. 9B is the same view showing dough 40 rolled out to fill orifice 22 and overlap onto surface 24a. Thus, the dough 40 within orifice 22 will have approximately the same thickness and shape as the thickness and shape of orifice 22. FIG. 9C is top perspective view of assembly 10 showing insert 20a removed from assembly 10 and with a round sheet of dough 40 suitable for use as, for example, a pie crust, resting on inner board 20 and having the desired approximate uniform thickness of orifice 22. Board 20 holding dough 40 may then be removed from within inner perimeter 14. A plurality of inserts 20a having different thicknesses and/or shapes may be provided with assembly 10.

It will be recognized by those having skill in the art that outer frame 11, board 20, insert 20a, and orifice 22 may have shapes different than seen the accompanying figures. In addition, it will be recognized that because the components of assembly 10, namely board 20 and insert 20a, are placed within frame 11 from above the plane of frame 11, it is easier to assemble and disassemble and clean assembly 10 as compared to similar devices in the art.

FIGS. 11A and 11B depict another embodiment of assembly 10 in which the bottom surface of inner board 20 is flush with the bottom edge 13 of outer frame 11. Rolling pin 30 is seen extending across to the opposite upper edges 12 of outer frame 11 with dough 40 being worked in a manner similar to that seen in FIGS. 8A and 8B. Preferably, in this embodiment, antiskid pads 16 will be placed on both lower edge 13 of frame 11 and the bottom surface 25 of inner board 20 as seen in FIGS. 11A and 11B.

Figure 12A:
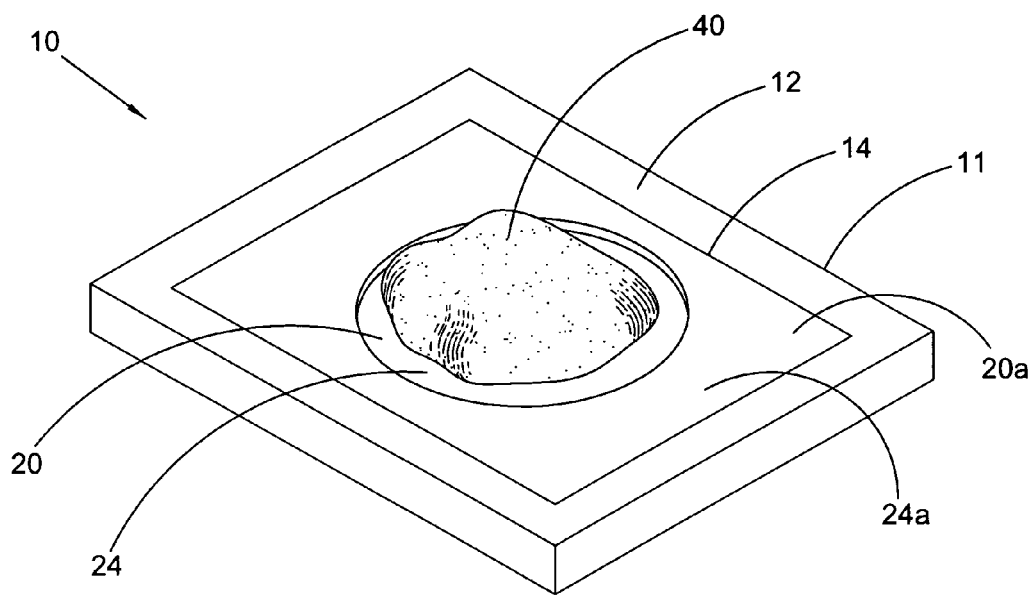
FIG. 12A is a top perspective view of an alternate embodiment of dough processing assembly seen in FIG. 11A to include the insert positioned on top of the inner board within the inner perimeter showing a ball of dough within the orifice.
Figure 12B:
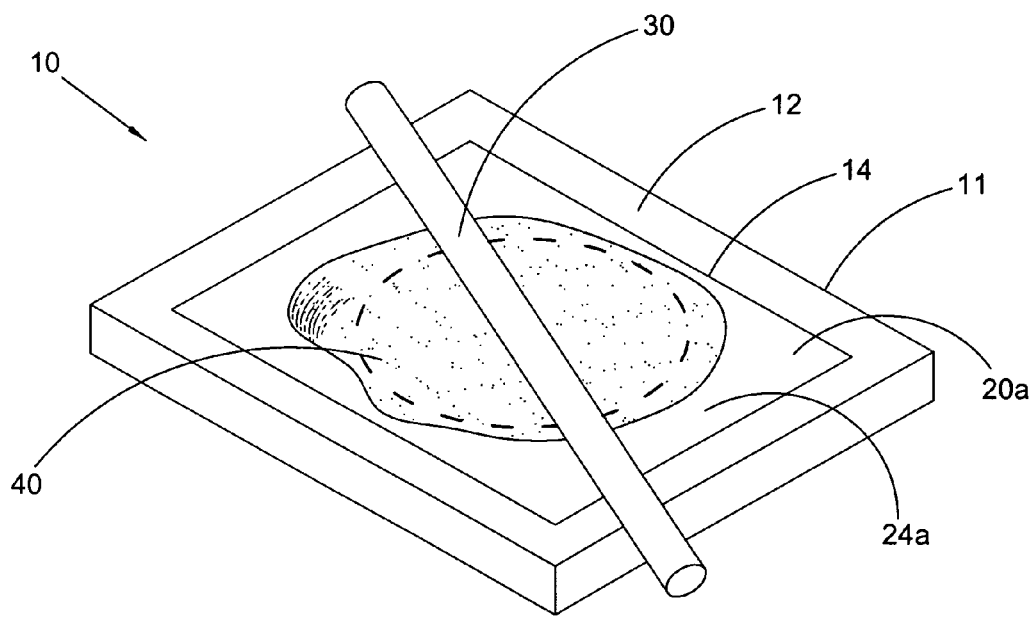
FIG. 12B is the same view as seen in FIG. 12A with the dough rolled to fill the orifice in the insert; and, FIG. 12C shows the insert removed from the dough processing assembly with the rolled dough remaining in place on the inner board.
Figure 12C:
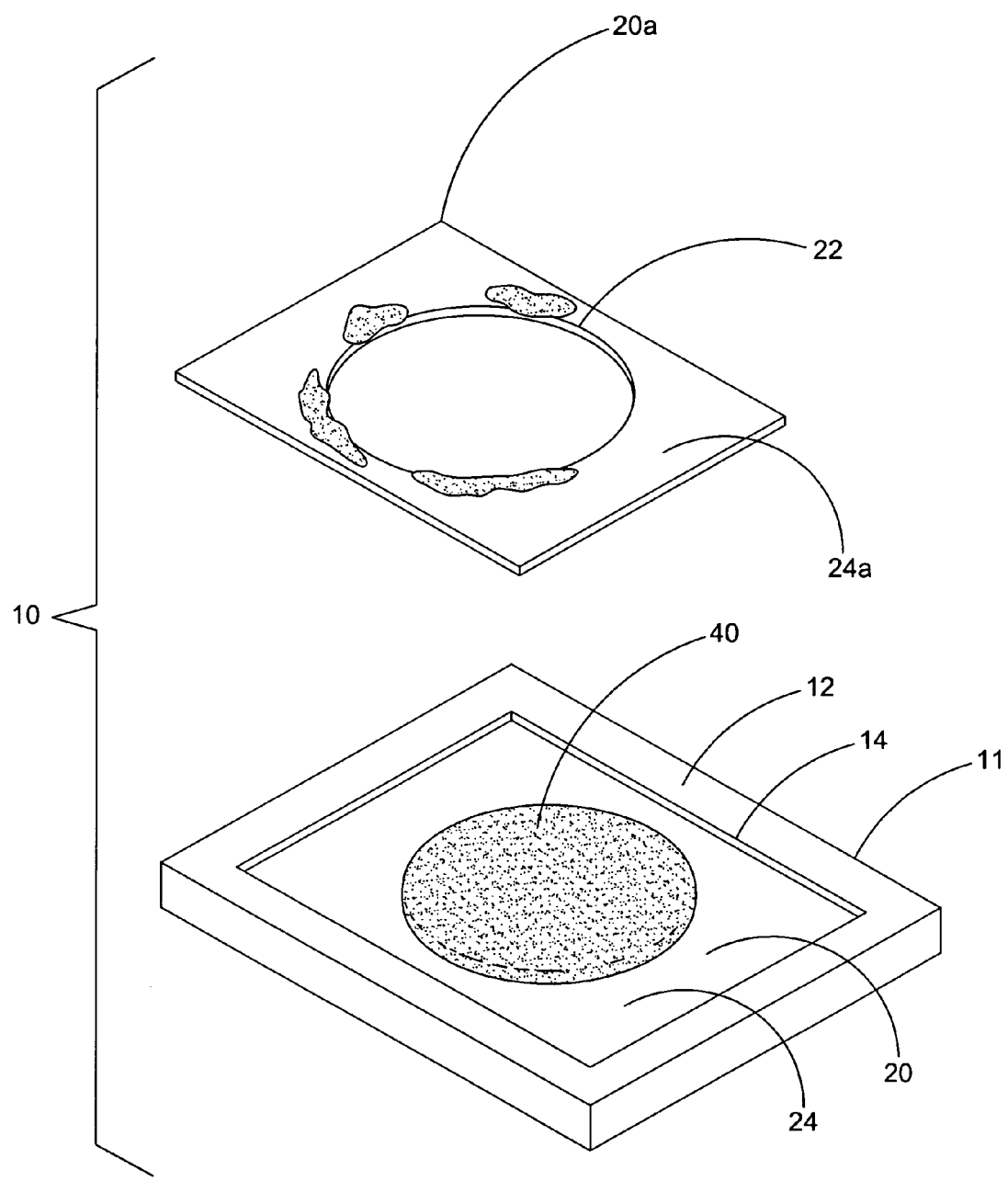

FIGS. 12A is a top perspective view of assembly 10 in the embodiment shown in FIGS. 11A and 11B. Similar to the embodiment shown in FIG. 9A, insert 20a is positioned on top of board 20 within inner perimeter 14. In this embodiment, as shown in FIGS. 12A and 12B, board 20 is resting on a table top, counter, or similar surface. Dough 40 is placed within orifice 22. FIG. 12B shows dough 40 rolled out to fill orifice 22 and overlap onto insert surface 24a. FIG. 12C shows insert 20a removed from assembly 10 and a round sheet of dough 40 resting on inner board 20 with the approximate uniform thickness of orifice 22. Outer frame 11 may then be lifted from around board 20. A plurality of inserts 20a having different thicknesses and/or shapes may be provided with this embodiment of assembly 10.

Fabrication of assembly 10 from plastic provides several advantages over the wood materials described in the prior art. Use of plastic allows the components of assembly 10 to be cleaned in dishwashers at higher temperatures than wood dough boards. In addition, only plastic materials can be used to form the refrigerant groove(s) in the preferred embodiment described above. Moreover, wood boards must be sealed on a periodic basis and must be maintained in order to prevent small wood pieces from breaking off and embedding into the dough. Such pieces can be generated by pressing cookie cutters and other cutting devices into the wood boards.

Figure 10:
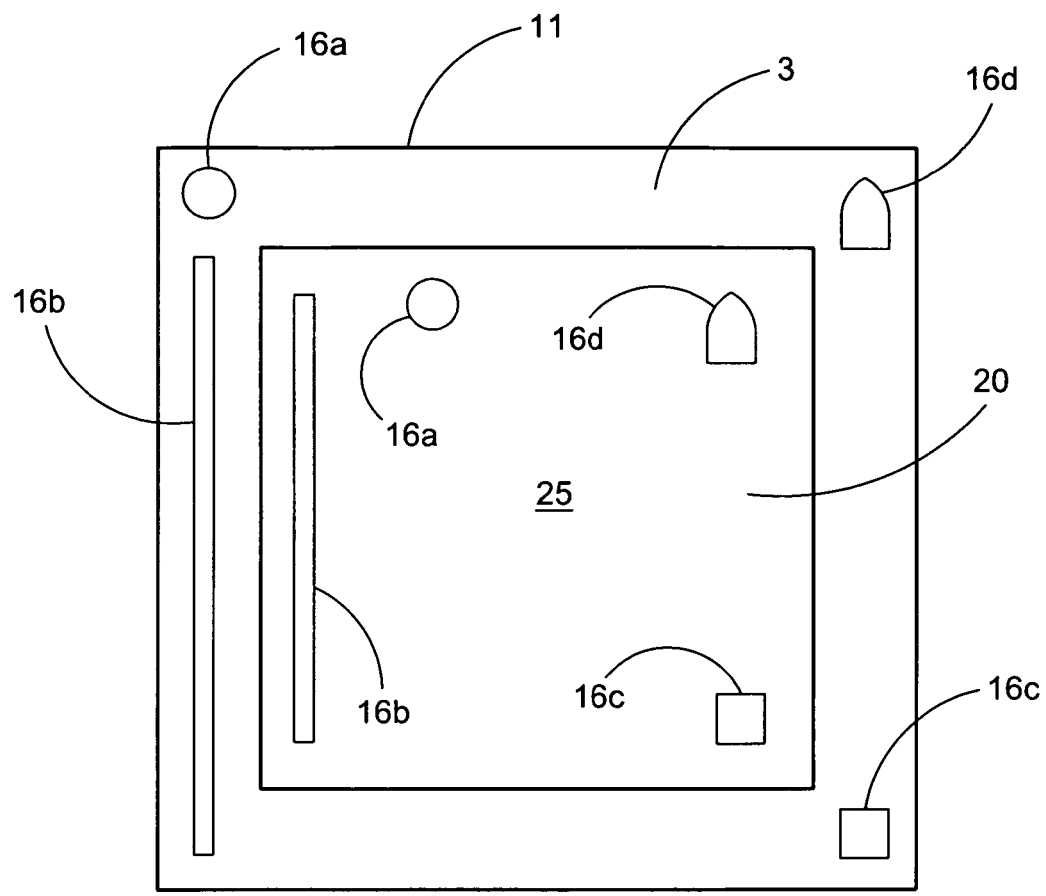
FIG. 10 is a bottom view of the outer frame showing different embodiments of antiskid pads attached to the lower edge of the outer frame and lower surface of the inner board.

FIG. 10 is a bottom view of outer frame 11 showing lower edge 13. Different shapes of antiskid pad 16 are shown attached to lower edge 13 and bottom surface 25 including round or circular discs 16a, strips or ribbons 16b, squares 16c, and chevrons 16d. It will be recognized by those having skill in the art that other shapes may be used. Pads 16 may be fabricated from polyurethane, vinyl, or other materials known to those having skill in the art and may be attached to lower edge 13 and/or bottom surface 25 using suitable adhesives, a peel and stick system, or other suitable adhering means known to those having skill in the art.

Thus it is seen that the objects of the invention are efficiently obtained, although changes and modifications to the invention should be readily apparent to those having ordinary skill in the art, which changes would not depart from the spirit and scope of the invention as claimed.

I claim:

1. A dough board assembly comprising
   an outer frame defining an open space, said outer frame including:
      an upper edge and a lower edge; and,
      at least one shoulder extending from an inner perimeter of said outer frame, said inner perimeter having at least one perimeter length and at least one perimeter width, wherein said at least one inner perimeter length is equal to or longer than said at least one inner perimeter width and wherein said outer frame is integral in construction; and,
   at least one inner board having an upper surface and a lower surface and a plurality of continuous edges extending between said upper surface and said lower surface and sized to fit on said at least one shoulder within said inner perimeter;
   wherein at least one of said upper surface and said lower surface is below at least one of said upper edge and said lower edge; and,
   wherein said all of said plurality of continuous edges are smooth.

2. The dough board assembly as recited in claim 1 wherein said at least one shoulder is a single shoulder.

3. The dough board assembly as recited in claim 1 wherein said at least one shoulder is a plurality of shoulders.

4. The dough board assembly as recited in claim 1 further comprising a diagonal length and wherein said at least one perimeter length is two perimeter lengths and said at least one perimeter width is two perimeter widths.

5. The dough board assembly as recited in claim 4 further comprising a rolling pin having a length greater than said diagonal length.

6. The dough board assembly as recited in claim 1 wherein said at least one inner board includes at least one internal groove.

7. The dough board assembly as recited in claim 6 wherein said at least one internal groove is a plurality of internal grooves.

8. The dough board assembly as recited in claim 6 wherein at least one of said at least one internal groove is filled with a refrigerant.

9. The dough board assembly as recited in claim 1 further comprising at least one insert wherein said at least one insert is removably supported by said inner board and at least one of said upper edge and said lower edge extends above said supported insert.

10. The dough board assembly as recited in claim 1 wherein said at least one inner board is a plurality of inner boards wherein at least two of said plurality of inner boards differ in thickness.

11. The dough board assembly as recited in claim 1 further comprising at least one antiskid pad attached to said lower edge of said outer frame.

12. A dough board assembly comprising
    an outer frame defining an open space, said outer frame including:
       an upper edge and a lower edge; and,
       at least one shoulder extending from an inner perimeter of said outer frame, said inner perimeter having at least one perimeter length and at least one perimeter width, wherein said at least one inner perimeter length is equal to or longer than said at least one inner perimeter width and wherein said outer frame is integral in construction; and,
    at least one inner board having an upper surface and a lower surface and a plurality of continuous edges extending between said upper surface and said lower surface wherein said at least one shoulder fits over said upper surface;
    wherein said upper surface is below said upper edge;
    wherein said all of said plurality of continuous edges are smooth.

13. The dough board assembly as recited in claim 12 wherein said at least one shoulder is a single shoulder.

14. The dough board assembly as recited in claim 12 wherein said at least one shoulder is a plurality of shoulders.

15. The dough board assembly as recited in claim 12 further comprising a diagonal length and wherein said at least one perimeter length is two perimeter lengths and said at least one perimeter width is two perimeter widths.

16. The dough board assembly as recited in claim 15 further comprising a rolling pin having a length greater than said diagonal length.

17. The dough board assembly as recited in claim 12 wherein at least one of said at least one inner board includes at least one internal groove.

18. The dough board assembly as recited in claim 17 wherein said at least one internal groove is a plurality of internal grooves.

19. The dough board assembly as recited in claim 17 wherein at least one of said at least one internal groove is filled with a refrigerant.

20. The dough board assembly as recited in claim 12 further comprising at least one insert wherein said at least one insert is removably supported by said inner board and said upper edge extends above said supported insert.

21. The dough board assembly as recited in claim 12 further comprising at least one antiskid pad attached to said lower edge of said outer frame.

22. The dough board assembly as recited in claim 12 further comprising at least one antiskid pad attached to said lower surface of said at least one inner board.

* * * * *